US011332551B2

(12) United States Patent
Wada et al.

(10) Patent No.: US 11,332,551 B2
(45) Date of Patent: May 17, 2022

(54) METHOD FOR MANUFACTURING POLYMER AND FLOW-TYPE REACTION SYSTEM FOR MANUFACTURING POLYMER

(71) Applicant: FUJIFILM Corporation, Tokyo (JP)

(72) Inventors: Kenji Wada, Kanagawa (JP); Hideki Matsumoto, Kanagawa (JP); Kei Harada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/826,288

(22) Filed: Mar. 22, 2020

(65) Prior Publication Data
US 2020/0223949 A1 Jul. 16, 2020

Related U.S. Application Data

(63) Continuation of application No. PCT/JP2018/035625, filed on Sep. 26, 2018.

(30) Foreign Application Priority Data

Sep. 28, 2017 (JP) .............................. JP2017-188932

(51) Int. Cl.
C08F 2/01 (2006.01)
C08F 2/06 (2006.01)
(Continued)

(52) U.S. Cl.
CPC ..................... C08F 2/01 (2013.01); B01J 8/06 (2013.01); C08F 2/04 (2013.01); C08F 2/40 (2013.01); C08F 12/08 (2013.01); C08K 5/56 (2013.01)

(58) Field of Classification Search
CPC ..................... C08F 2/01; C08F 2/40
See application file for complete search history.

(56) References Cited

U.S. PATENT DOCUMENTS

2019/0062464 A1* 2/2019 Tadokoro .............. B01F 5/0609

FOREIGN PATENT DOCUMENTS

JP 2016160124 9/2016
JP 2017066276 4/2017
(Continued)

OTHER PUBLICATIONS

Computer-generated English-language translation of JP-2017066276-A.*
(Continued)

Primary Examiner — Vu A Nguyen
(74) Attorney, Agent, or Firm — JCIPRNET

(57) ABSTRACT

A method for manufacturing a polymer by performing an anionic polymerization reaction by a flow-type reaction, including: introducing a liquid A containing an anionic polymerizable monomer, a liquid B containing an anionic polymerization initiator, and a polymerization terminator into different flow paths respectively and causing the liquids to flow in the respective flow paths; causing the liquid A and the liquid B to join together by using a multilayered cylindrical mixer; subjecting the anionic polymerizable monomer to anionic polymerization while a solution formed by the joining is flowing to downstream in the reaction flow path; and causing a polymerization reaction solution flowing in a reaction flow path and the polymerization terminator to join together such that the polymerization reaction is terminated; and a flow-type reaction system suitable for performing the manufacturing method.

10 Claims, 3 Drawing Sheets

(51) Int. Cl.
    *C08F 2/38*           (2006.01)
    *C08F 4/48*           (2006.01)
    *C08F 2/04*           (2006.01)
    *C08F 2/40*           (2006.01)
    *C08F 12/08*         (2006.01)
    *C08K 5/56*          (2006.01)
    *B01J 8/06*           (2006.01)

(56) References Cited

FOREIGN PATENT DOCUMENTS

| WO | 2008042182 | 4/2008 |
| WO | 2017135398 | 8/2017 |

OTHER PUBLICATIONS

"International Search Report (Form PCT/ISA/210) of PCT/JP2018/035625," dated Jan. 8, 2019, with English translation thereof, pp. 1-5.
"Written Opinion of the International Searching Authority (Form PCT/ISA/237) of PCT/JP2018/035625," dated Jan. 8, 2019, with English translation thereof, pp. 1-8.
"Office Action of Japan Counterpart Application", dated Apr. 14, 2020, with English translation thereof, p. 1-p. 6.
"Office Action of Europe Counterpart Application", dated Feb. 4, 2022, p. 1-p. 4.

\* cited by examiner

METHOD FOR MANUFACTURING POLYMER AND FLOW-TYPE REACTION SYSTEM FOR MANUFACTURING POLYMER

CROSS-REFERENCE TO RELATED APPLICATIONS

This application is a Continuation of PCT International Application No. PCT/JP2018/035625 filed on Sep. 26, 2018, which claims priority under 35 U.S.C. § 119 (a) to Japanese Patent Application No. 2017-188932 filed in Japan on Sep. 28, 2017. Each of the above applications is hereby expressly incorporated by reference, in its entirety, into the present application.

BACKGROUND OF THE INVENTION

1. Field of the Invention

The present invention relates to a method for manufacturing a polymer. Furthermore, the present invention relates to a flow-type reaction system used for manufacturing a polymer.

2. Description of the Related Art

Living anionic polymerization is known as a method that can realize a precise polymerization reaction in synthesizing polymers having special structures such as a monodisperse polymer, a block copolymer, a functional group-terminated polymer, a multibranched polymer, and a cyclic polymer.

As described in "Japanese Journal of Polymer Science and Technology", August, 2009, vol. 66, No. 8, p. 321 to 330, usually, the living anionic polymerization is performed by the batch method. However, in a case where the living anionic polymerization is performed by a batch method, the heat generated during the polymerization needs to be removed so as to inhibit side reactions such as a chain transfer reaction and a termination reaction, and accordingly, the polymerization reaction is performed at an extremely low temperature. For example, the polymerization reaction is performed by mixing an anionic polymerizable monomer with an anionic polymerization initiator in a state of cooling the monomer and the initiator at a temperature equal to or lower than −78° C. Therefore, for performing the living anionic polymerization by the batch method, cryogenic cooling facilities are required, and unfortunately, such a polymerization method is not suited for mass production.

Furthermore, because the living anionic polymerization by the batch method is carried out in a state of performing mechanical stirring, the monomer or the polymerization initiator tends to be unevenly localized in the reaction system. Accordingly, in the living anionic polymerization by the batch method, there is a limit to the improvement of the dispersity of the obtained polymer and/or to the reproducibility of the dispersity of the obtained polymer.

In addition, there is also a method known to continuously obtain a polymer having a narrow molecular weight distribution by means of living anionic polymerization by using a flow-type reaction device such as a microreactor. For example, JP2017-066276A describes an anionic polymerization reaction by a flow-type reaction, in which the equivalent diameter of a flow path, into which a liquid A containing an anionic polymerizable monomer is introduced, and a flow path, into which a liquid B containing an anionic polymerization initiator is introduced, is set to be within a specific range, and the flow velocity of the liquid B is set to be within a specific range so as to continuously and stably obtain a polymer having a highly monodispersed molecular weight with high efficiency.

SUMMARY OF THE INVENTION

By using the flow-type anionic polymerization system described in JP2017-066276A, the inventors of the present invention performed an examination regarding the industrial commercialization of the manufacturing of a polymer. While performing the examination, the inventors found that in a case where a flow-type reaction is carried out in a range of a flow velocity equal to or higher than a certain speed so as to increase the manufacturing efficiency, the dispersity of the obtained polymer varies with the flow velocity of a monomer solution and an initiator solution introduced into the flow paths, and accordingly, in order to stably supply a polymer having consistent quality, the flow velocity of the solutions need to be precisely controlled. However, in order to precisely control the flow velocity in the flow-type reaction, sometimes the load on the manufacturing facilities, maintenance, and the like increases, and the flexibility of the manufacturing condition is restricted, which becomes an obstacle to the commercialization.

An object of the present invention is to provide a method for manufacturing a polymer by performing an anionic polymerization reaction by a flow-type reaction, in which even though a flow velocity of a liquid containing an anionic polymerizable monomer (hereinafter, simply referred to as "monomer solution" as well) and/or a liquid containing an anionic polymerization initiator (hereinafter, simply referred to as "initiator solution" as well) that are allowed to flow in a flow path is changed, the change in the dispersity of the obtained polymer can be inhibited, and a polymer monodispersed at a constant dispersity can be stably obtained. Another object of the present invention is to provide a flow-type reaction system suitable for performing the manufacturing method.

In order to achieve the above objects, the inventors of the present invention repeated intensive examinations. As a result, the inventors have found that at the time of performing the anionic polymerization reaction by a flow-type reaction, in a case where a multilayered cylindrical mixer is used as a mixer constituting a joining portion of the monomer solution and the initiator solution instead of the T-shaped mixer described in JP2017-066276A, the dispersity of the obtained polymer is hardly affected by the flow velocity of the monomer solution and/or the initiator solution, and a polymer monodispersed at a constant dispersity can be stably supplied even though the flow velocity of solutions is not precisely controlled.

More specifically, the inventors have found that in order to obtain a polymer by introducing a monomer solution, an initiator solution, and a polymerization terminator into different flow paths respectively, causing the monomer solution and the initiator solution to join together in a state of allowing the solutions to flow in the respective flow paths, subjecting the anionic polymerizable monomer to anionic polymerization while a solution formed by the joining is flowing to downstream in a reaction flow path, and causing the polymerization terminator to join with the solution in the downstream so as to terminate the anionic polymerization reaction, in a case where the monomer solution and the initiator solution are joined together by using a multilayered cylindrical mixer, the above objects can be achieved.

Based on this finding, examinations were further repeated, and as a result, the present invention has accomplished.

That is, the objects of the present invention have achieved by the following means.

[1] A method for manufacturing a polymer by performing an anionic polymerization reaction by a flow-type reaction, including introducing a liquid A containing an anionic polymerizable monomer, a liquid B containing an anionic polymerization initiator, and a polymerization terminator into different flow paths respectively and causing the liquids to flow in the respective flow paths, causing the liquid A and the liquid B to join together by using a multilayered cylindrical mixer, subjecting the anionic polymerizable monomer to anionic polymerization while a solution formed by the joining is flowing to downstream in the reaction flow path, and causing the solution, which has undergone the polymerization reaction and flows in the reaction flow path, and the polymerization terminator to join together such that the polymerization reaction is terminated.

[2] The method for manufacturing a polymer described in [1], in which a flow velocity at which the liquid B is introduced is 10 to 500 mL/min.

[3] The method for manufacturing a polymer described in [1] or [2], in which a ratio of a flow velocity A, at which the liquid A is introduced, to a flow velocity B, at which the liquid B is introduced, that is represented by [flow velocity A]/[flow velocity B] is 10/1 to 1.2/1.

[4] The method for manufacturing a polymer described in any one of [1] to [3], in which an equivalent diameter of a smallest cylinder of the multilayered cylindrical mixer is 0.1 to 50 mm.

[5] The method for manufacturing a polymer described in any one of [1] to [4], in which in a case where r1 represents a linear velocity of a liquid flowing in an internal flow path of a smallest cylinder of the multilayered cylindrical mixer and r2 represents a linear velocity of a liquid flowing in a flow path adjacent to the internal flow path of the smallest cylinder, a value of a ratio of r2 to r1 satisfies the following Expression (I) or (II):

$$r2/r1 \leq 0.67 \quad (I)$$

$$r2/r1 \geq 1.5 \quad (II)$$

here, any one of the liquid flowing in the internal flow path of the smallest cylinder or the liquid flowing in the flow path adjacent to the internal flow path of the smallest cylinder is the liquid A, and the other is the liquid B.

[6] The method for manufacturing a polymer described in any one of [1] to [5], in which a double-layered cylindrical mixer is used as the multilayered cylindrical mixer.

[7] The method for manufacturing a polymer described in any one of [1] to [6], in which at least one anionic polymerization initiator between an organic lithium compound and an organic magnesium compound is used as the anionic polymerization initiator.

[8] The method for manufacturing a polymer described in any one of [1] to [7], in which n-butyllithium is used as the anionic polymerization initiator.

[9] The method for manufacturing a polymer described in any one of [1] to [8], in which the liquid B contains an aromatic hydrocarbon.

[10] A flow-type reaction system for manufacturing a polymer by an anionic polymerization reaction, including at least a first flow path through which an anionic polymerizable monomer flows, a second flow path through which an anionic polymerization initiator flows, a third flow path through which a polymerization terminator flows, a first joining region having a multilayered cylindrical mixer in which the first flow path and the second flow path join together, a reaction tube connected to a downstream of the first joining region, a second joining region in which the reaction tube and the third flow path join together, and a pipe line connected to a downstream of the second joining region.

In the present specification, "compound (including a polymer)" means a compound, a salt thereof, and an ion thereof. Furthermore, as long as the intended effect is brought about, "compound" also means a compound obtained by changing a portion of the structure of "compound".

In the present specification, a range of numerical values described using "to" means a range including the numerical values listed before and after "to" as a lower limit and an upper limit.

In the present specification, in a case where a compound is described as "monodisperse", the dispersity of the compound is preferably equal to or lower than 1.25, and more preferably equal to or lower than 1.2.

According to the method for manufacturing a polymer of an embodiment of the present invention, it is possible to stably obtain a polymer monodispersed at a constant dispersity without the necessity of precisely controlling the flow velocity of a liquid flowing in a flow path. Furthermore, in a case where the flow-type reaction system according to an embodiment of the present invention is used to perform the aforementioned manufacturing method, the flow-type reaction system makes it possible to stably obtain a polymer monodispersed at a constant dispersity without the necessity of precisely controlling a liquid feeding speed.

DESCRIPTION OF THE PREFERRED EMBODIMENTS

[Flow-Type Reaction System]

Figure 1:
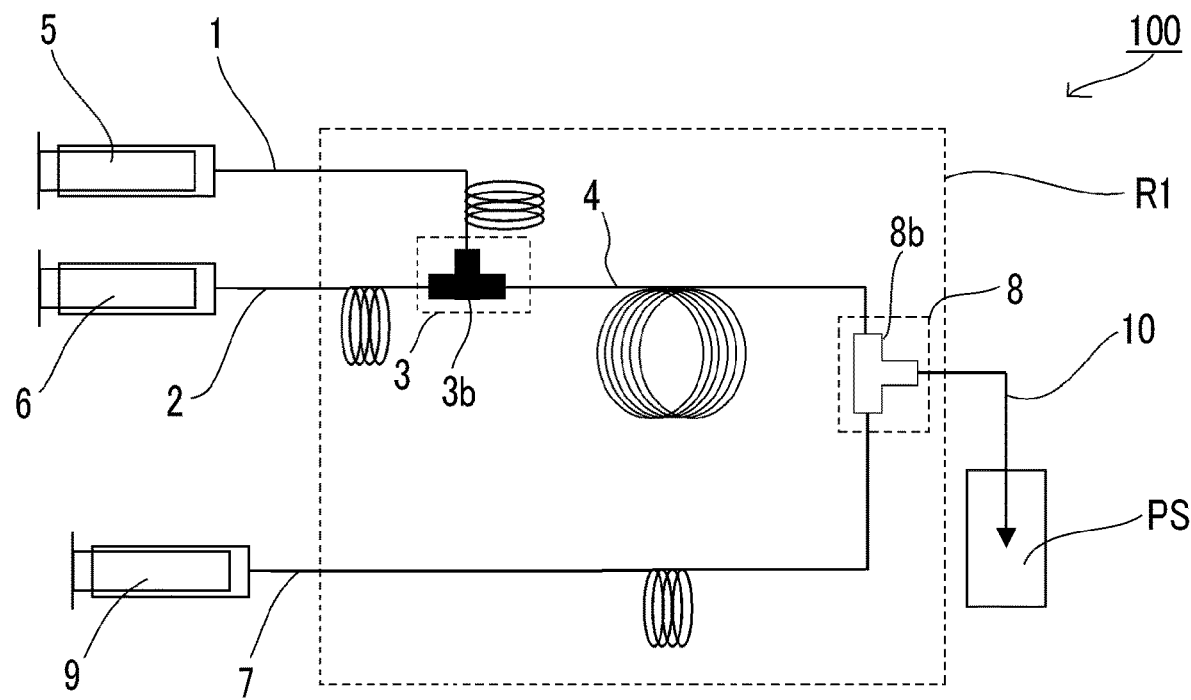
FIG. 1 is a view for schematically illustrating an embodiment of a flow-type reaction system of the present invention.

An embodiment of a flow-type reaction system used in the method for manufacturing a polymer according to an embodiment of the present invention (hereinafter, described as "manufacturing method of the present invention" as well) will be described using drawings. Except for the items specified by the present invention, the present invention is not limited to the aspects shown in the drawings.

FIG. 1 is a schematic view showing an example of the flow-type reaction system used in the manufacturing method of the present invention. A flow-type reaction system (100) shown in FIG. 1 comprises an anionic polymerizable monomer supply flow path (1) connected to introduction means (5) for a liquid containing an anionic polymerizable monomer (hereinafter, referred to as "liquid A" as well), an anionic polymerization initiator supply flow path (2) connected to introduction means (6) for a liquid containing an anionic polymerization initiator (hereinafter, referred to as "liquid B" as well), a polymerization terminator supply flow path (7) connected to introduction means (9) for a polymerization terminator, a joining region (3, a first joining region) in which the anionic polymerizable monomer supply flow path (1) and the anionic polymerization initiator supply flow path (2) join together, a reaction tube (4) connected to the end of the downstream side of the joining region (3), a joining region (8, a second joining region) in which the reaction tube (4) and the polymerization terminator supply flow path (7) join together, and a pipe line (10) connected to the end of the downstream side of the joining region (8).

In the aspect shown in FIG. 1, a double-layered cylindrical mixer (3b) as a form of multilayered cylindrical mixer is disposed in the joining region (3).

Figure 4:
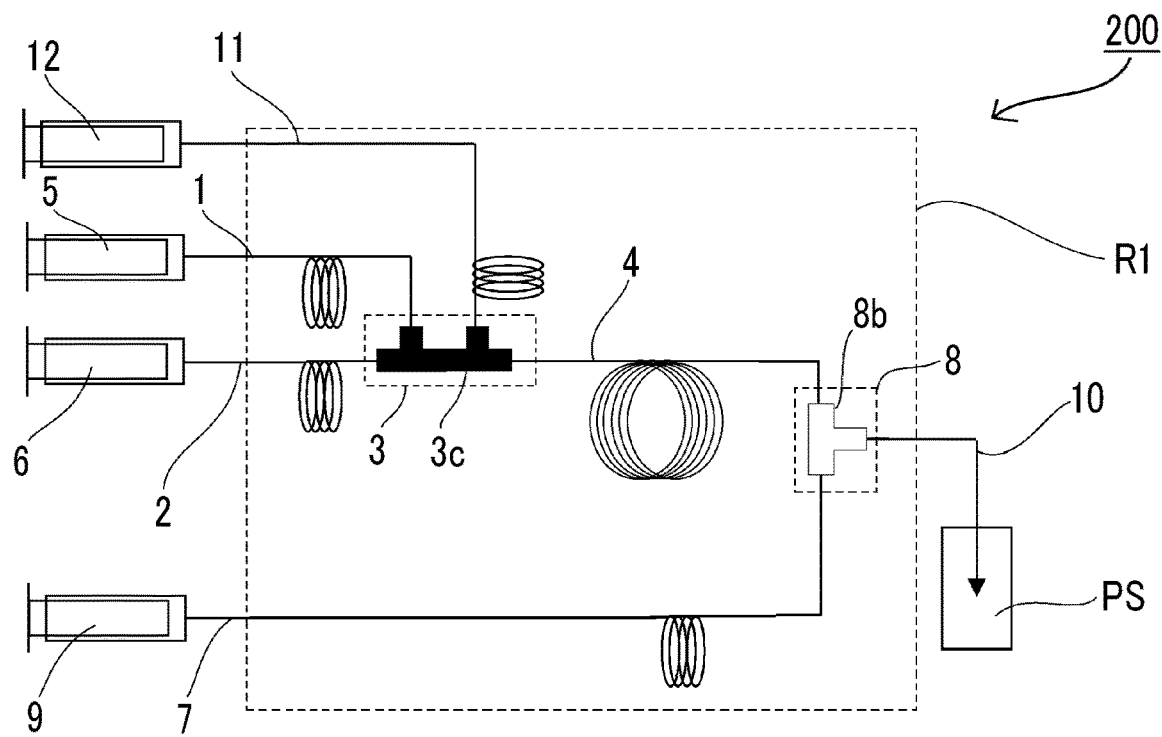
FIG. 4 is a view for schematically illustrating another embodiment of the flow-type reaction system of the present invention.

FIG. 4 shows another flow-type reaction system (200) preferred for performing a method for manufacturing nanoparticles according to an embodiment of the present invention.

The flow-type reaction system (200) shown in FIG. 4 comprises an anionic polymerizable monomer supply flow path (1) connected to introduction means (5) for the liquid A, an anionic polymerization initiator supply flow path (2) connected to introduction means (6) for the liquid B, a third flow path (11) connected to introduction means (12) for a third liquid which will be described later, a polymerization terminator supply flow path (7) connected to introduction means (9) for a polymerization terminator, a joining region (3, a first joining region) in which the anionic polymerizable monomer supply flow path (1), the anionic polymerization initiator supply flow path (2), and the third flow path (11) join together, a reaction tube (4) connected to the downstream of the joining region (3), a joining region (8, a second joining region) in which the reaction tube (4) and the polymerization terminator supply flow path (7) join together, and a pipe line (10) connected to the end of the downstream side of the joining region (8).

In the aspect shown in FIG. 4, a triple-layered cylindrical mixer as a form of multilayered cylindrical mixer is used in the joining region (3).

As the introduction means (5, 6, 9, and 12), various pumps can be used without particular limitation. As such pumps, it is possible to use a syringe pump, a plunger pump, a smoothflow pump, and the like, and these can control a liquid to have the desired flow velocity.

In the embodiment shown in FIG. 1, at least the joining region (3), a region between the joining region (3) and the joining region (8), the joining region (8), and at least a portion of the pipe line (10) connected to the joining region (8) are disposed in a constant-temperature tank (R1). During an anionic polymerization reaction and a polymerization termination reaction, it is preferable that the constant-temperature tank (R1) is controlled such that the liquid temperature becomes −100° C. to 40° C. (preferably −80° C. to 20° C., and more preferably −50° C. to 10° C.). Likewise, in the aspect shown in FIG. 4, it is preferable that the constant-temperature tank (R1) is controlled such that the liquid temperature falls into the above range.

In the present specification, "upstream" and "downstream" are used for the direction along which a liquid flows. A side where a liquid is introduced (in FIG. 1, the side of the introduction means (5, 6, 9, and 12)) is upstream, and a side opposite to the upstream is downstream.

Each of the constituents of the flow-type reaction system according to the embodiment of the present invention will be specifically described.

<Anionic Polymerizable Monomer Supply Flow Path (1)>

The anionic polymerizable monomer supply flow path (1) is a flow path for supplying the liquid A introduced from the introduction means (5) to the joining region (3). The equivalent diameter of the anionic polymerizable monomer supply flow path (1) is preferably 0.1 to 10 mm, and more preferably 1 to 10 mm. In a case where the equivalent diameter of the anionic polymerizable monomer supply flow path (1) is equal to or smaller than 10 mm, the temperature of a liquid flowing into the joining region (3) can be more accurately controlled. The equivalent diameter of the anionic polymerizable monomer supply flow path (1) is more preferably 1 to 8 mm, even more preferably 1 to 6 mm, and particularly preferably 1 to 4 mm.

"Equivalent diameter" is a term used in the field of mechanical engineering, and is also called equilibrium diameter. Assuming that there is a circular tube equivalent to a pipe line or a flow path having a given inner cross-sectional shape of the tube, the diameter of the inner cross-section of the equivalent circular tube is referred to as equivalent diameter. The equivalent diameter (deq) is defined as dep=4A/p in which A represents an inner cross-sectional area of a pipe line and p represents a wetted perimeter (inner perimeter) of a pipe line. In a case where the above definition is applied to a circular tube, the equivalent diameter equals the diameter of the inner cross section of the circular tube. Based on the data regarding an equivalent circular tube, the equivalent diameter is used for estimating the fluidity or the heat transfer characteristics of the pipe line, and shows the spatial scale (representative length) of a phenomenon. For a square tube in which a represents one side of the inner cross section of the tube, the equivalent diameter dep=$4a^2/4a$=a; for an equilateral triangular tube in which a represents one side thereof, deq=$a/3^{1/2}$; and for a flow between parallel flat plates in which h represents a height of a flow path, deq=2 h (for example, see "Mechanical Engineering Dictionary", edited by The Japan Society of Mechanical Engineers, 1997, Maruzen Co., Ltd).

The length of the anionic polymerizable monomer supply flow path (1) is not particularly limited, and the anionic polymerizable monomer supply flow path (1) can be constituted, for example, with a tube having a length of about 10 cm to 10 m (preferably 30 cm to 5 m).

The material of the tube is not particularly limited, and examples thereof include perfluoroalkoxyalkane (PFA), Teflon (registered trademark), an aromatic polyether ketone-based resin, stainless steel, copper (or an alloy thereof), nickel (or an alloy thereof), titanium (or an alloy thereof), quartz glass, soda lime glass, and the like. From the viewpoint of flexibility and chemical resistance, as the material of the tube, PFA, Teflon (registered trademark), stainless steel, a nickel alloy (Hastelloy), or titanium is preferable.

The flow velocity of the liquid A flowing in the anionic polymerizable monomer supply flow path (1) is not particularly limited, and can be appropriately selected according to the purpose in consideration of the equivalent diameter of the flow path, the concentration of the liquid B, the flow rate of the liquid B introduced, and the like. For example, the flow velocity of the liquid A flowing in the anionic polymerizable monomer supply flow path (1) is preferably 1 to 2,000 mL/min, more preferably 5 to 500 mL/min, even more preferably 10 to 200 mL/min, and still more preferably 10 to 100 mL/min.

From the viewpoint of further improving the productivity of a polymer, the flow velocity of the liquid A flowing in the anionic polymerizable monomer supply flow path (1) is preferably equal to or higher than 30 mL/min, more preferably equal to or higher than 40 mL/min, even more preferably equal to or higher than 45 mL/min, still more preferably equal to or higher than 50 mL/min, and particularly preferably equal to or higher than 55 mL/min.

(Liquid A Containing Anionic Polymerizable Monomer)

The liquid A flowing in the anionic polymerizable monomer supply flow path (1) may be an anionic polymerizable monomer. However, from the viewpoint of melting point, viscosity, and the removal of heat generated by a reaction, generally the liquid A is a solution obtained by dissolving an anionic polymerizable monomer in a solvent.

The solvent contained in the liquid A may be appropriately selected according to the type of the monomer to be used. Examples of the solvent include a linear, branched, or cyclic ether solvent, a hydrocarbon solvent, and the like. More specifically, as the ether solvent, it is possible to use tetrahydrofuran, dioxane, trioxane, methyl t-butyl ether, cyclopentyl methyl ether, ethylene glycol dibutyl ether, diethylene glycol dimethyl ether, diethylene glycol diethyl ether, diethylene glycol dibutyl ether, derivatives of these, and the like. As the hydrocarbon solvent, it is possible to use hexane, heptane, octane, cyclohexane, methyl cyclohexane, benzene, toluene, xylene, decalin, tetralin, derivatives of these, and the like. Among these, from the viewpoint of the solubility or the polymerization rate of a monomer, tetrahydrofuran is preferably used.

—Anionic Polymerizable Monomer—

The anionic polymerizable monomer in the liquid A is not particularly limited, and can be appropriately selected according to the purpose. Examples thereof include a vinyl aromatic hydrocarbon, a conjugated diene, and the like.

Examples of the vinyl aromatic hydrocarbon include styrene, a styrene derivative (p-dimethylsilylstyrene, (p-vinylphenyl)methylsulfide, p-hexynylstyrene, p-methoxystyrene, p-tert-butyldimethylsiloxystyrene, o-methylstyrene, p-methylstyrene, p-tert-butyl styrene, α-methylstyrene, p-t-butoxystyrene, p-t-butoxy-α-methylstyrene, m-t-butoxystyrene, p-(1-ethoxyethoxy)styrene, or the like), vinyl naphthalene, 2-tert-butoxy-6-vinyl naphthalene, vinyl anthracene, 1,1-diphenylethylene, and the like.

Examples of the conjugated diene include 1,3-butadiene, 2-methyl-1,3-butadiene, 2,3-dimethyl-1,3-butadiene, 1,3-pentadiene, 1,3-hexadiene, 1,3-cyclohexadiene, and the like.

One kind of each of the above monomers may be used singly, or two or more kinds of the above monomers may be used in combination.

The content of the anionic polymerizable monomer in the liquid A is not particularly limited, and is appropriated adjusted according to the purpose in consideration of the concentration of an initiator in the liquid B, the flow rate of the liquid B, and the like. The content of the anionic polymerizable monomer in the liquid A is preferably 1% to 100% by mass, more preferably 3% to 70% by mass, even more preferably 5% to 50% by mass, and still more preferably 10% to 40% by mass.

From the viewpoint of viscosity and the removal of heat generated by a reaction, the molar concentration of the anionic polymerizable monomer in the liquid A is preferably 0.5 to 10 M, and more preferably 0.5 to 5 M.

In the liquid A, the proportion of the total amount of the anionic polymerizable monomer and the solvent is preferably equal to or higher than 90% by mass, more preferably equal to or higher than 95% by mass, and even more preferably equal to or higher than 97% by mass.

<Anionic Polymerization Initiator Supply Flow Path (2)>

The anionic polymerization initiator supply flow path (2) is a flow path for supplying the liquid B introduced from the introduction means (6) to the joining region (3). The equivalent diameter of the anionic polymerization initiator supply flow path (2) is preferably 0.1 to 10 mm, and more preferably 1 to 10 mm. In a case where the equivalent diameter of the anionic polymerization initiator supply flow path (2) is equal to or smaller than 10 mm, the temperature of a liquid flowing into the joining region (3) can be more accurately controlled. The equivalent diameter of the anionic polymerization initiator supply flow path (2) is more preferably 1 to 8 mm, even more preferably 1 to 6 mm, and particularly preferably 1 to 4 mm.

The length of the anionic polymerization initiator supply flow path (2) is not particularly limited, and the anionic polymerization initiator supply flow path (2) can be constituted, for example, with a tube having a length of about 10 cm to 10 m (preferably 30 cm to 5 m).

The material of the tube is not particularly limited. As the tube, it is possible to use a tube formed of a material exemplified above for the anionic polymerizable monomer supply flow path (1).

The flow velocity of the liquid B flowing in the anionic polymerization initiator supply flow path (2) is not particularly limited, and can be appropriately selected according to the purpose in consideration of the equivalent diameter of the flow path, the concentration of the liquid A, the flow rate of the liquid A introduced, and the like. For example, the flow velocity of the liquid B flowing in the anionic polymerization initiator supply flow path (2) is preferably 1 to 2,000 mL/min, more preferably 5 to 500 mL/min, even more preferably 10 to 500 mL/min, even more preferably 10 to 200 mL/min, and still more preferably 10 to 100 mL/min.

From the viewpoint of improving the productivity of a polymer, the flow velocity of the liquid B flowing in the anionic polymerization initiator supply flow path (2) is preferably equal to or higher than 20 mL/min, more preferably equal to or higher than 25 mL/min, even more preferably equal to or higher than 30 mL/min, and particularly preferably equal to or higher than 35 mL/min.

From the viewpoint of controlling the molecular weight of a polymer, it is preferable that a flow velocity B of the liquid B flowing in the anionic polymerization initiator supply flow path (2) is lower than a flow velocity A of the liquid A flowing in the anionic polymerizable monomer supply flow path (1). A ratio of the flow velocity A to the flow velocity B that is represented by [flow velocity A]/[flow velocity B] is preferably 20/1 to 1.2/1, more preferably 10/1 to 1.2/1, even more preferably 5/1 to 1.2/1, and particularly preferably 3/1 to 1.3/1. In addition, [flow velocity A]/[flow velocity B] is also preferably 10/1 to 1.05/1, 5/1 to 1.1/1, 3/1 to 1.1/1, or 2/1 to 1.15/1. In the present specification, the unit of flow velocity is mL/min as described above.

In the method for manufacturing a polymer according to the embodiment of the present invention, it is preferable that the value of [flow velocity A]/[flow velocity B] is constant (fixed ratio).

(Liquid B Containing Anionic Polymerization Initiator)

The liquid B flowing in the anionic polymerization initiator supply flow path (2) may be an anionic polymerization initiator. However, from the viewpoint of viscosity and stability, generally, the liquid B is a solution obtained by dissolving an anionic polymerization initiator in a solvent. The solvent contained in the liquid B may be appropriately selected according to the type of the initiator to be used. Examples thereof include a linear, branched, or cyclic hydrocarbon solvent and the like. More specifically, examples thereof include hexane, heptane, octane, cyclohexane, methyl cyclohexane benzene, toluene, xylene, decalin, tetralin, derivatives of these, and the like.

Particularly, it is preferable that the solvent used in liquid B contains an aromatic hydrocarbon. As the aromatic hydrocarbon, for example, toluene and xylene are preferable. Among these, toluene is preferably used. In a case where an aromatic hydrocarbon is used as the solvent, a monomer conversion rate is increased, and hence the polymerization rate can be further increased. Particularly, in a case where toluene is used, a monomer conversion rate can be significantly increased, which is advantageous particularly for manufacturing a polymer having a high molecular weight.

—Anionic Polymerization Initiator—

The anionic polymerization initiator used in the liquid B is not particularly limited, and a wide variety of initiators used in general anionic polymerization can be used. The anionic polymerization initiator is appropriately selected according to the type of the monomer to be used.

In a case where the method of the polymerization described above is anionic polymerization which is a living polymerization method, examples of the polymerization initiator include an organic lithium compound or an organic magnesium compound.

The organic lithium compound is not particularly limited, and can be appropriately selected from conventionally known organic lithium compounds. Examples thereof include alkyl lithium such as methyl lithium, ethyl lithium, propyl lithium, butyl lithium (n-butyllithium, sec-butyllithium, iso-butyllithium, tert-butyllithium, or the like), pentyl lithium, hexyl lithium, methoxymethyl lithium, or ethoxymethyl lithium; benzyl lithium such as α-methylstyryllithium, 1,1-diphenyl-3-methylpentryllithium, or 3-methyl-1,1-diphenylpentyllithium; alkenyl lithium such as vinyl lithium, allyl lithium, propenyl lithium, or butenyl lithium, alkynyl lithium such as ethynyl lithium, butynyl lithium, pentynyl lithium, or hexynyl lithium; aralkyl lithium such as benzyl lithium or phenyl ethyl lithium; aryl lithium such as phenyl lithium or naphthyl lithium; heterocyclic lithium such as 2-thienyllithium, 4-pyridyllithium, or 2-quinolyllithium; an alkyl lithium-magnesium complex such as tri(n-butyl)magnesium lithium or trimethyl magnesium lithium, and the like. Among these, alkyl lithium is more preferable, and n-butyllithium is particularly preferable, because these compounds have high reactivity and can cause an initiation reaction at a high speed. Among butyl lithium compounds, n-butyllithium is preferable because, for example, this compound exhibits high stability in a solution state. For example, in a case where sec-butyllithium is used, this compound is gradually precipitated in a suspension state without being dissolved, which leads to a concern that the quality stability in the industrial production of a polymer may become problematic. One kind of each of the above organic lithium compounds may be used singly, or two or more kinds of the above organic lithium compounds may be used in combination.

Examples of the organic magnesium compound include di-n-butylmagnesium, di-t-butylmagnesium, di-s-butylmagnesium, n-butyl-s-butylmagnesium, n-butyl-ethylmagnesium, di-n-amylmagnesium, dibenzyl magnesium, diphenyl magnesium, and the like.

The content of the anionic polymerization initiator in the liquid B is not particularly limited, and is appropriately adjusted according to the purpose in consideration of the concentration of a monomer in the liquid A, the flow rate of the liquid A introduced, and the like. The content of the anionic polymerization initiator in the liquid B is generally 0.01% to 20% by mass, more preferably 0.01% to 15% by mass, even more preferably 0.01% to 10% by mass, and still more preferably 0.05% to 10% by mass.

From the viewpoint of controlling the molecular weight of a polymer, the molar concentration of the anionic polymerization initiator in the liquid B is preferably 0.008 to 1.6 M, more preferably 0.01 to 1.6 M, and even more preferably 0.01 to 0.8 M.

In the liquid B, the proportion of the total amount of the anionic polymerization initiator and the solvent is preferably equal to or higher than 90% by mass, more preferably equal to or higher than 95% by mass, and even more preferably equal to or higher than 97% by mass.

Regarding the amount of the liquid A and the liquid B introduced, in a case where the liquid A and the liquid B are assumed to be homogeneously mixed together in the joining region (3), a ratio of equivalent of anionic polymerization initiator:equivalent of anionic polymerization monomer is preferably 1:5 to 1:5,000, more preferably 1:10 to 1:5,000, and particularly preferably 1:10 to 1:1,000. The equivalent ratio that is within the particularly preferred range described above is advantageous, because in this range, it is possible to obtain a polymer having a molecular weight that is substantially equal to a theoretical molecular weight. That is, in a case where the monomer is a compound having one polymerizable functional group, the amount of the monomer used with respect to 1 mol of the initiator is preferably 5 to 5,000 mol, more preferably 10 to 5,000 mol, and particularly preferably 10 to 1,000 mol.

<Joining Region (3)>

In the present invention, the joining region (3) is constituted with a multilayered cylindrical mixer (3b).

(Multilayered Cylindrical Mixer)

Figure 2:
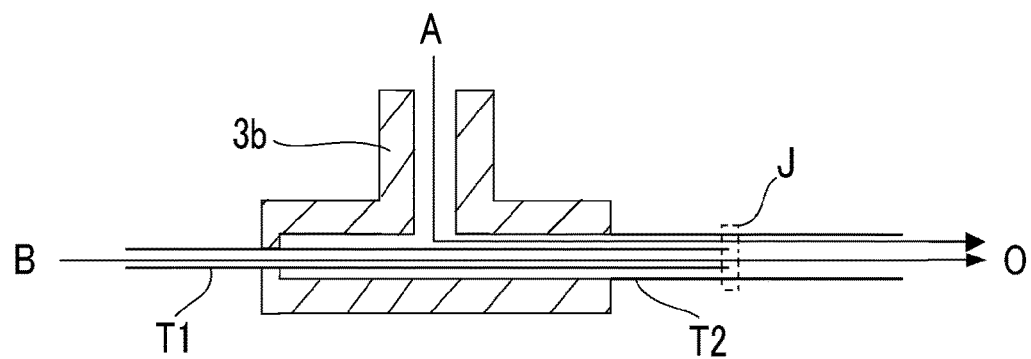
FIG. 2 is a cross-sectional view of a double-layered cylindrical mixer installed in a joining region in the embodiment shown in FIG. 1.
Figure 3:
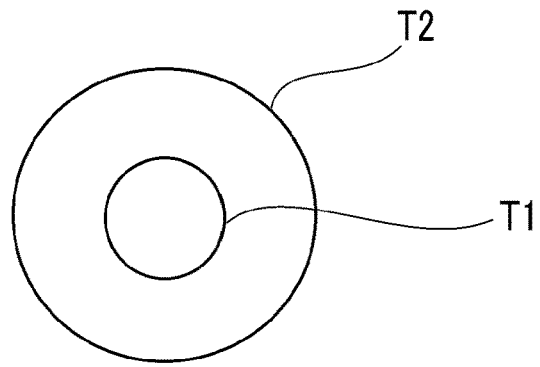
FIG. 3 is a view of a joining portion J of the double-layered cylindrical mixer in FIG. 2 that is seen from the O side.
Figure 5:
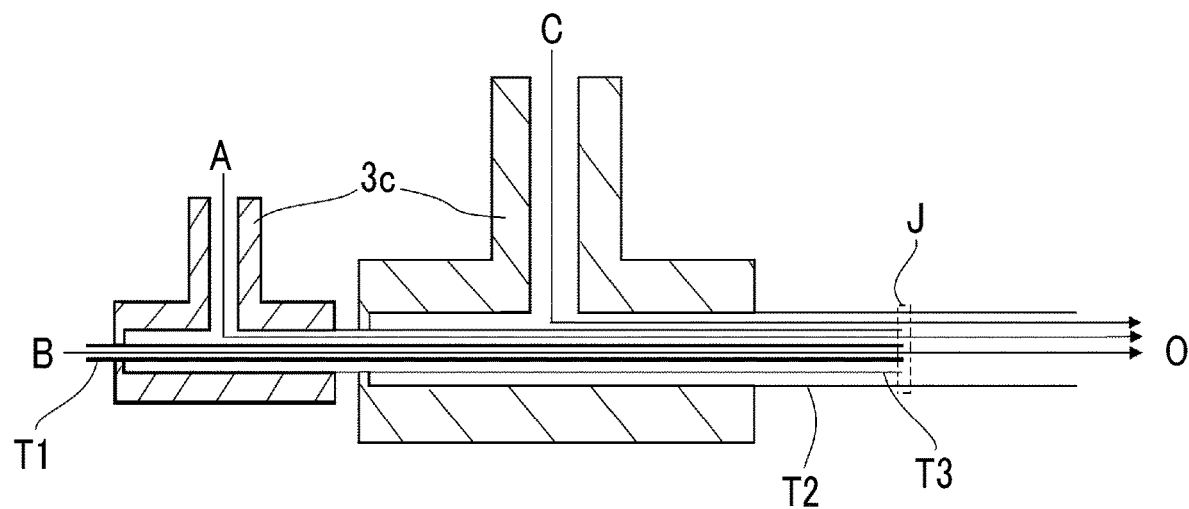
FIG. 5 is a cross-sectional view of a triple-layered cylindrical mixer installed in a joining region in the embodiment shown in FIG. 4.
Figure 6:
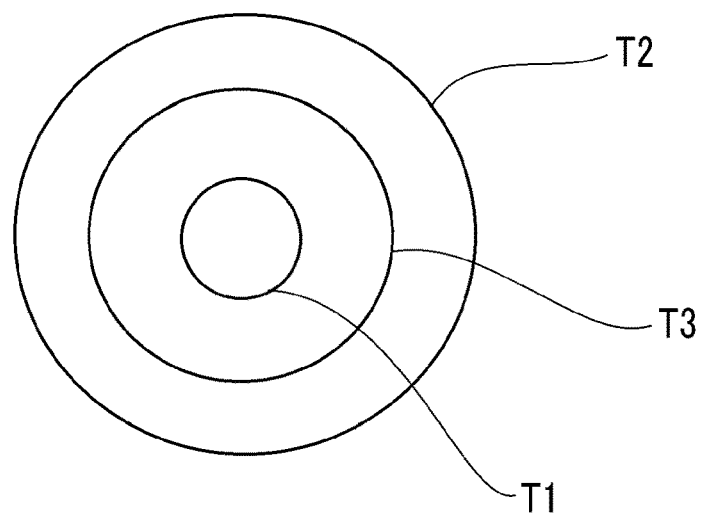
FIG. 6 is a view of a joining portion J of the triple-layered cylindrical mixer in FIG. 5 that is seen from the O side.

Examples of a preferred aspect of the multilayered cylindrical mixer used in the joining region (3) include the double-layered cylindrical mixer shown in FIGS. 1 to 3 and the triple-layered cylindrical mixer shown in FIGS. 4 to 6. Furthermore, a multilayered cylindrical mixer including four or more layers may also be used. Hereinafter, the double-layered cylindrical mixer and the triple-layered cylindrical mixer as preferred aspects will be described, but a multi-layered cylindrical mixer including four or more layers can also be used based on the aspects. Particularly, in the present invention, the aspect in which the double-layered cylindrical mixer is used (aspect shown in FIG. 1) is preferable.

—Double-Layered Cylindrical Mixer—

FIG. 2 is a cross-sectional view showing a state where liquids are joining together by using the double-layered cylindrical mixer (3b) applied to the joining region (3) in FIG. 1. The anionic polymerization initiator supply flow path (2) is connected to an opening B of the smallest cylinder (T1, inner tube) penetrating the double-layered cylindrical mixer (3b), or the anionic polymerization initiator supply flow path (2) is integrated with the smallest cylinder (T1). As a result, the liquid B flowing in the anionic polymerization initiator supply flow path (2) flows to the O side from the opening B in the smallest cylinder (T1). In the present invention, the interior of the smallest cylinder is called internal flow path of the smallest cylinder.

The anionic polymerizable monomer supply flow path (1) is connected to an opening A of the double-layered cylindrical mixer (3b). As a result, the liquid A, which has flown into the double-layered cylindrical mixer (3b) through the anionic polymerizable monomer supply flow path (1), fills up the flow path (smallest cylinder (T1)) adjacent to the internal flow path of the smallest cylinder and a cylinder (T2, an outer tube) adjacent to the smallest cylinder and flows toward the O side.

In the terminal portion on the O side of the smallest cylinder (T1) (joining portion J), the solution, which is the liquid B, flowing in the flow path of the smallest cylinder toward the O side joins with the liquid A, which has flown into the joining portion by flowing toward the O side in the flow path adjacent to the flow path of the smallest cylinder, and introduced into a reaction flow path (4) connected to the downstream.

FIG. 3 is a cross-sectional view of the joining portion J in FIG. 2 that is seen from the O side. In FIG. 3, the liquid B flows in the smallest cylinder (T1), and the liquid A flows between the smallest cylinder (T1) and the cylinder (T2) adjacent to the smallest cylinder.

The liquid A and the liquid B join together by the double-layered cylindrical mixer (3b), and while the solution formed by the joining is flowing in the reaction tube (4), the anionic polymerizable monomer is polymerized. As a result, a polymer is generated.

In the embodiment shown in FIG. 1, in a case where r1 represents a linear velocity of the liquid B flowing in the internal flow path of the smallest cylinder of the double-layered cylindrical mixer (3b), and r2 represents a linear velocity of the liquid A flowing in the flow path adjacent to the internal flow path of the smallest cylinder of the mixer, the value of a ratio of r2 to r1 (r2/r1) is preferably equal to or lower than 0.67 or equal to or higher than 1.5. In a case where there is a specific difference between the linear velocities of the solutions flowing in the mixer, it is possible to further improve the monodispersibility of the obtained polymer, and to further inhibit the variation in the dispersity of the obtained polymer.

It is unclear why the above effect is brought about in a case where r2/r1 is equal to or lower than 0.67 or equal to or higher than 1.5. Presumably, as one of the reasons, in a case where r2/r1 is within the above range, when the liquid A and the liquid B join together in the mixer, a certain level of negative pressure may be applied to a portion where the linear velocity is high, and accordingly, a flow coming into the portion may occur, the interface between the solutions may become a thin layer, and hence the solutions could be uniformly mixed together in an instant (within about 50 ms, for example). That is, presumably, because a polymerization reaction can occur in a state where the concentration unevenness is extremely small, a monodispersed polymer may be obtained. Furthermore, due to the reduction in the concentration unevenness, the dispersity of the obtained polymer is hardly affected by the flow velocity, and accordingly, even though the setting of the flow velocity of a pump for feeding the liquid A or the liquid B is not precisely controlled (for example, in a case where systems having different flow velocities are compared), the dispersity of the obtained polymer hardly changes.

In a case where r2/r1 is equal to or lower than 0.67, the lower limit thereof is not particularly limited. Generally, r2/r1 is equal to or higher than 0.01. In reality, the lower limit of r2/r1 is equal to or higher than 0.1. Furthermore, the lower limit of r2/r1 is preferably equal to or higher than 0.2, equal to or higher than 0.3, or equal to or higher than 0.4. In a case where r2/r1 is equal to or higher than 1.5, the upper limit thereof is not particularly limited. Generally, the upper limit of r2/r1 is equal to or lower than 100. In reality, the upper limit of r2/r1 is equal to or lower than 10. Furthermore, the upper limit of r2/r1 is preferably equal to or lower than 5, equal to or lower than 3.3, or equal to or lower than 2.5. r2/r1 can be adjusted by adjusting the flow velocity of the solution introduced by the introduction means for the solution or by adjusting the cross-sectional area of the flow path in the mixer.

In the present invention, the unit of "linear velocity" is cm/min, for example. In this case, the linear velocity is calculated by dividing a flow velocity ($cm^3$/min) of a solution fed by solution feeding means by a cross-sectional area ($cm^2$) of a flow path through which the solution flows.

Hitherto, an aspect has been described in which the liquid B is allowed to flow in the internal flow path of the smallest cylinder, and the liquid A is allowed to flow in the flow path adjacent to the internal flow path of the smallest cylinder. However, the liquids allowed to flow may be switched. That is, an aspect, in which the liquid A is allowed to flow in the internal flow path of the smallest cylinder and the liquid B is allowed to flow in the flow path adjacent to the internal flow path of the smallest cylinder, is also preferable as an embodiment of the method for manufacturing nanoparticles according to the embodiment of the present invention. In this case, the relationship between the flow velocity as well as the linear velocity of the liquid flowing in the internal flow path of the smallest cylinder and the flow velocity as well as the linear velocity of the liquid flowing in the flow path adjacent to the internal flow path of the smallest cylinder is the same as the relationship in the preferred aspect described above with reference FIG. 1 to FIG. 3.

—Triple-Layered Cylindrical Mixer—

FIG. 5 is a cross-sectional view showing a state where liquids are joining together by using a triple-layered cylindrical mixer (3c) applied to the joining region (3) in FIG. 4. The anionic polymerization initiator supply flow path (2) is connected to an opening B of the smallest cylinder (T1, inner tube) penetrating the triple-layered cylindrical mixer (3c), or the anionic polymerization initiator supply flow path (2) is integrated with the smallest cylinder (T1). As a result, the liquid B flowing in the anionic polymerization initiator supply flow path (2) flows toward the O side from the opening B in the smallest cylinder (T1).

The anionic polymerizable monomer supply flow path (1) is connected to an opening A of the triple-layered cylindrical mixer (3c). As a result, the liquid A, which has flown into the triple-layered cylindrical mixer (3c) through the anionic polymerizable monomer supply flow path (1), fills up the flow path (smallest cylinder (T1)) adjacent to the internal flow path of the smallest cylinder and a cylinder (T3, a middle tube) adjacent to the smallest cylinder (T1) and flows toward the O side.

The third flow path (11) is connected to an opening C of the triple-layered cylindrical mixer (3c). As a result, a third liquid, which has flown into the triple-layered cylindrical mixer (3c) by flowing in the third flow path (11), fills up the portion between the cylinder (T3) adjacent to the smallest cylinder (T1) and an outermost cylinder (T2, an outer tube) and flows toward the O side.

In the terminal portion on the O side of the smallest cylinder (T1) (joining portion J), the liquid B flowing in the internal flow path of the smallest cylinder toward the O side joins with the liquid A, which has flown into the joining portion by flowing toward the O side in the flow path adjacent to the internal flow path of the smallest cylinder, and is introduced into the reaction flow path (4) connected to the downstream.

FIG. 6 is a cross-sectional view of the joining portion J in FIG. 5 that is seen from the O side. In FIG. 6, the liquid B flows in the smallest cylinder (T1), the liquid A flows between the cylinder (T3) adjacent to the smallest cylinder (T1) and the smallest cylinder (T1), and the third liquid flows between the outermost cylinder (T2) and the cylinder (T3) adjacent to the smallest cylinder.

In a case where the liquid A and the liquid B join together by the triple-layered cylindrical mixer (3c), the anionic polymerizable monomer is polymerized while the solution formed by the joining is flowing to downstream. As a result, a polymer is generated.

In the embodiment shown in FIG. 4, in a case where r1 represents a linear velocity of the liquid B flowing in the internal flow path of the smallest cylinder of the triple-layered cylindrical mixer (3c), and r2 represents a linear velocity of the liquid A flowing in the flow path adjacent to the internal flow path of the smallest cylinder of the mixer, the value of a ratio of r2 to r1 (r2/r1) is preferably equal to or lower than 0.67 or equal to or higher than 1.5. In a case where there is a specific difference between the linear velocities of the solutions flowing in the mixer, as in the embodiment shown in FIG. 1, it is possible to further improve the monodispersibility of the obtained polymer. Furthermore, even though the setting of the flow velocity of a pump for feeding the liquid A or the liquid B is not precisely controlled (for example, in a case where systems having different flow velocities are compared), the dispersity of the obtained polymer hardly changes.

In a case where r2/r1 is equal to or lower than 0.67, the lower limit thereof is not particularly limited. Generally, r2/r1 is equal to or higher than 0.01. In reality, the lower limit of r2/r1 is equal to or higher than 0.1. Furthermore, r2/r1 is preferably equal to or higher than 0.2, equal to or higher than 0.3, or equal to or higher than 0.4. In a case where r2/r1 is equal to or higher than 1.5, the upper limit thereof is not particularly limited. Generally, the upper limit of r2/r1 is equal to or lower than 100. In reality, the upper limit of r2/r1 is equal to or lower than 10. Furthermore, the upper limit of r2/r1 is preferably equal to or lower than 5, equal to or lower than 3.3, or equal to or lower than 2.5. r2/r1 can be adjusted by adjusting the flow velocity of the solution introduced by the introduction means for the solution or by adjusting the cross-sectional area of the flow path in the mixer.

In the embodiment shown in FIG. 4, as described above, the third liquid is allowed to flow between the outermost cylinder (T2) and the cylinder (T3) adjacent to the smallest cylinder. The third liquid can prevent the mixed solution (polymerization reaction solution) of the liquid A and the liquid B from contacting the wall surface of the flow path. For example, the third liquid can play a role of preventing the precipitation of granular substances on the wall surface of the flow path. For instance, in a case where n-butyllithium is used as a polymerization initiator, by the action of a trace of water present in the reaction solution, the n-butyllithium is hydrolyzed and generates a certain amount of lithium hydroxide. In a case where the lithium hydroxide contacts the wall surface of the flow path, the precipitates of the lithium hydroxide gradually grow on the wall surface. However, in a case where a liquid capable of dissolving lithium hydroxide is allowed to flow as the third liquid, it is possible to prevent the growth of precipitates on the wall surface of the flow path.

In the embodiment shown in FIGS. 4 to 6, the liquid B may be allowed to flow in the flow path adjacent to the internal flow path of the smallest cylinder, and the liquid A may be allowed to flow in the internal flow path of the smallest cylinder. This embodiment is also preferable as an embodiment of the manufacturing method of the present invention.

Furthermore, the third liquid may be allowed to flow in the flow path adjacent to the internal flow path of the smallest cylinder. In this case, one of the liquid A and the liquid B is allowed to flow in the internal flow path of the smallest cylinder, and the other is allowed to flow between the outermost cylinder (T2) and the cylinder (T3) adjacent to the smallest cylinder. In this aspect, the third liquid can play a role of uniformizing the initial polymerization rate and preventing the precipitation of substances that block a nozzle portion. The linear velocity of the third liquid is preferably within a range that is between the linear velocity of the liquid A and the linear velocity of the liquid B.

The cross-sectional shape of the tube, the flow path, and the opening of the multilayered cylindrical mixer is not particularly limited, and may be circular, elliptic, or polygonal such as rectangular or quadrangular. From the viewpoint of making it difficult for a liquid to stay in the mixer, the tube, the flow path, and the opening of the multilayered cylindrical mixer more preferably have a circular cross-sectional shape.

The equivalent diameter as the inner diameter of the smallest cylinder (inner tube) of the multilayered cylindrical mixer is preferably 0.1 to 50 mm, more preferably 0.1 to 10 mm, even more preferably 0.1 to 5 mm, and particularly preferably 0.1 to 2 mm. The equivalent diameter as the inner diameter of the outermost cylinder (outer tube) varies with the number of layers constituting the mixer. Generally, the equivalent diameter as the inner diameter of the outermost cylinder is 0.5 to 100 mm, preferably 1 to 30 mm, more preferably 2 to 20 mm, and even more preferably 2 to 15 mm. The equivalent diameter as the inner diameter of the middle tube between the smallest cylinder and the outermost cylinder can be appropriately adjusted based on the equivalent diameter of the inner tube and the outer tube.

The equivalent diameter of a cylinder of the multilayered cylindrical mixer may be the same as or different from the equivalent diameter of a flow path connected to the cylinder.

The multilayered cylindrical mixer used in the present invention can be manufactured by combining a joint such as Bored-Through Union Tee (manufactured by Swagelok Company) and a pipe line having arbitrary inner diameter and external shape. Furthermore, it is possible to use a known structure such as the structure described in JP2006-096569A as the multilayered cylindrical mixer.

<Reaction Tube (4)>

The liquid A and the liquid B join together in the joining region (3), mixed together by the multilayered cylindrical mixer, and then flow into the reaction tube (4) which is a reaction flow path. While the mixed solution is flowing to downstream in the reaction tube (4), the anionic polymerizable monomer undergoes anionic polymerization.

The form of the reaction tube (4) is not particularly limited. Generally, a tube is used as the reaction tube (4). The material preferred for the reaction tube (4) is the same as the material preferred for the anionic polymerizable monomer supply flow path (1) described above. The reaction time required for the anionic polymerization can be adjusted according to the equivalent diameter and the length of the reaction tube (4), the setting of the flow rate of a liquid feeding pump, and the like. The retention time of a reaction solution flowing in the reaction tube (4) may be appropriately adjusted according to the molecular weight of the desired polymer. Generally, the equivalent diameter of the reaction tube (4) is 0.1 to 50 mm, more preferably 0.2 to 20 mm, even more preferably 0.4 to 15 mm, still more preferably 0.7 to 10 mm, and yet more preferably 1 to 5 mm. The length of the reaction tube (4) is preferably 0.05 to 50 m, more preferably 0.5 to 50 m, even more preferably 1 to 50 m, and still more preferably 3 to 50 m.

<Polymerization Terminator Supply Flow Path (7)>

The polymerization terminator supply flow path (7) is a flow path for supplying the polymerization terminator introduced from the introduction means (9) for a polymerization terminator to the joining region (8). The equivalent diameter of the polymerization terminator supply flow path (7) is preferably 1 to 10 mm, more preferably 1 to 8 mm, even more preferably 1 to 6 mm, and still more preferably 1 to 4 mm. The length of the polymerization terminator supply flow path (7) is not particularly limited. For example, the polymerization terminator supply flow path (7) can be constituted with a tube having a length of about 10 cm to 10 m (preferably 30 cm to 5 m). The material preferred for the polymerization terminator supply flow path (7) is the same as the material preferred for the anionic polymerizable monomer supply flow path (1) described above.

—Polymerization Terminator—

The polymerization terminator is not particularly limited as long as it is a liquid containing a component (polymerization termination component) deactivating anions which are active species. Examples of the polymerization terminator include an aqueous solution or an organic solution containing an alcohol and/or an acidic substance as a polymerization termination component (for example, a solution containing tetrahydrofuran (THF), methyl t-butyl ether, dioxane, cyclopentyl methyl ether, toluene, or the like as a solvent). Furthermore, as a polymerization terminator, it is also possible to use a liquid containing an electrophile such as a halogenated alkyl or chlorosilane as a polymerization termination component.

Examples of the alcohol as a polymerization termination component include methanol, ethanol, propanol, isopropyl alcohol, and the like.

Examples of the acidic substance as a polymerization termination component include acetic acid, hydrochloric acid, and the like.

Examples of halogenated alkyl as a polymerization termination component include alkyl fluoride, alkyl iodide, and the like.

In the mixed solution joined with the polymer solution, the amount of the polymerization termination components such as an alcohol, an acidic substance, and an electrophile contained in the polymerization terminator is preferably 1 mol to 100 mol with respect to 1 mol of the polymerization initiator.

The flow velocity at which the polymerization terminator is introduced from the introduction means (9) is not particularly limited, and can be appropriately selected according to the purpose. For example, the flow velocity can be set to be 1 to 1,000 mL/min. The flow velocity is more preferably 2 to 500 mL/min, and even more preferably 4 to 200 mL/min. In a case where the flow velocity is within the above range, solutions can be rapidly mixed together, and the concerns about the pressure loss is reduced.

<Joining Region (8)>

The polymerization reaction solution that has undergone anionic polymerization reaction while flowing in the reaction tube (4) and the polymerization terminator that flows in the polymerization terminator supply flow path (7) join together in the joining region (8). The joining region (8) is constituted with a mixer (8*b*). This mixer is not particularly limited as long as it can cause the reaction tube (4) and the polymerization terminator supply flow path (7) to join together as a single flow path and can send the liquid formed by the joining to the pipe line (10) of downstream. In the embodiment shown in FIGS. 1 and 4, a T-shaped connector (T-shaped mixer) is used as the joining region (8). As the mixer (8*b*), for example, the aforementioned multilayered cylindrical mixer can also be adopted.

The equivalent diameter of the flow path of the mixer (8*b*) in the joining region (8) is preferably 0.2 to 10 mm from the viewpoint of further improving the mixing performance, and more preferably 1 to 10 mm from the viewpoint of further inhibiting pressure loss.

The material of the mixer (8*b*) is not particularly limited. As the mixer (8*b*), it is possible to use a mixer formed of a material such as perfluoroalkoxyalkane (PFA), Teflon (registered trademark), an aromatic polyether ketone-based resin, stainless steel, copper (or an alloy thereof), nickel (or an alloy thereof), titanium (or an alloy thereof), quartz glass, or soda lime glass.

Furthermore, as the mixer (8*b*), commercial micromixers can also be used. Examples thereof include MICROGLASS REACTOR manufactured by Micro Glass Co., Ltd.; CYTOS manufactured by CPC Systems, Ltd.; YM-1 and YM-2 mixers manufactured by Yamatake Co., Ltd.; MIXING TEE & TEE manufactured by Shimadzu GLC Ltd. (T-shaped connector); MIXING TEE & TEE manufactured by GL Sciences (T-shaped connector); MIXING TEE & TEE manufactured by Upchurch Scientific (T-shaped connector); MIXING TEE & TEE manufactured by Valco Instruments Co., Inc. (T-shaped connector); a T-shaped connector manufactured by Swagelok Company, and the like. All of these can be used as the mixer (8*b*).

<Pipe Line (10)>

While flowing in the pipe line (10), the mixed solution containing the polymerization reaction solution and the polymerization terminator have a reaction, the anions are deactivated, and accordingly, polymerization is terminated.

The pipe line (10) can be constituted with a tube. From the viewpoint of more precisely controlling the liquid temperature of the liquid flowing in the pipe line (10), the equivalent diameter of the pipe line (10) is preferably 1 to 50 mm, and more preferably 1 to 10 mm. The length of the pipe line (10) may be appropriately adjusted according to the equivalent diameter, the flow rate, and the molecular weight of the desired polymer. The length of the pipe line (10) is preferably 1 to 10 m, and more preferably 1 to 5 m. The material preferred for the pipe line (10) is the same as the material preferred for the anionic polymerizable monomer supply flow path (1) described above.

The liquid temperature of the liquid flowing in the pipe line (10) is not particularly limited. However, as shown in FIGS. 1 and 4, it is preferable that at least the temperature of the upstream side of the liquid is as low as the temperature of the liquid flowing in the reaction tube (4).

The flow velocity of the liquid flowing in the pipe line (10) equals the sum of the flow velocity of the liquid flowing in the polymerization terminator supply flow path (7) and the flow velocity of the liquid flowing in the reaction tube (4).

In a case where a liquid (PS) is collected at the downstream of the pipe line (10), the desired polymer can be obtained. The state of the obtained polymer liquid is not particularly limited. For example, the liquid may be a solution containing the polymer dissolved in a solvent, or a dispersion liquid containing the polymer emulsified and dispersed in a solvent.

In the manufacturing method of the present invention, the retention time (reaction time) in the reaction tube (4) is preferably equal to or longer than 15 seconds, more preferably 20 to 1,800 seconds, and even more preferably 20 to 600 seconds. The retention time (reaction time) means the time taken for the mixed solution of the liquid A and the liquid B to be discharged from the outlet of a pipe line (5) after being introduced into the reaction tube (4).

According to the method for manufacturing a polymer according to the embodiment of the present invention, even though the flow velocity, at which the liquid A and the liquid B flow in the flow path, is set to be equal to or higher than a certain speed and then changed, it is possible to effectively inhibit the change in dispersity of the obtained polymer and to stably obtain a polymer monodispersed at a constant dispersity. That is, even though the flow velocity in a flow-type reaction is not precisely controlled, it is possible to stably obtain a polymer monodispersed at a constant dispersity.

EXAMPLES

Hereinafter, the present invention will be more specifically described based on examples, but the present invention is not limited to the examples.

Example 1

By using the flow-type reaction system constituted as shown in FIG. 1, a polymer was synthesized by an anionic polymerization reaction. Details of each portion are as below.

Liquid Feeding Pumps (5, 6, and 9):

As all of the liquid feeding pumps, PU716B manufactured by GL Sciences was used. On the side of flow rate outlet of the pumps, a pulse damper HPD-1, a backpressure valve (44-2361-24) manufactured by TESCOM, and a relief valve RHA (4 MPa) manufactured by IBS COMPANY are sequentially installed.

Low-Temperature Constant-Temperature Tank (R1):

A tabletop small low-temperature water bath CBi-270A manufactured by AS ONE Corporation was used. The temperature thereof was set to be −10° C.

Anionic Polymerizable Monomer Supply Flow Path (1):

An SUS316 tube was used which has an outer diameter of 1/16 inches, an inner diameter of 1.0 mm, and a length of 2 m.

Anionic Polymerization Initiator Supply Flow Path (2):

An SUS316 tube was used which has an outer diameter of 1/16 inches, an inner diameter of 1.0 mm, and a length of 2 m.

Joining Region (3) (Double-Layered Cylindrical Mixer):

As the double-layered cylindrical mixer 3b in the form of a concentric cylinder shown in FIGS. 2 and 3, UNION TEE (SS-400-3) manufactured by Swagelok Company was used. The anionic polymerizable monomer supply flow path (1) was connected to the opening A, and the anionic polymerization initiator supply flow path (2) was connected to the opening B. For the flow path of the mixer, an SUS316 straight tube having an outer diameter of 1/4 inches, an inner diameter of 4.35 mm, and a length of 50 mm was used as the outer tube T2, and an SUS316 straight tube having an outer diameter of 1/8 inches and an inner diameter of 2.17 mm was used as the inner tube T1. An inner tube end J from which a liquid will be discharged was set at the position 80 mm distant from an outer tube end.

Reaction Tube (4):

An SUS316 tube having an outer diameter of 1/8 inches, an inner diameter of 2.17 mm, and a length of 4.8 m was used.

Polymerization Terminator Supply Flow Path (7):

An SUS316 tube having an outer diameter of 1/16 inches, an inner diameter of 1.0 mm, and a length of 2 m was used.

Joining Region (8) (T-Shaped Connector):

UNION TEE (SS-200-3) manufactured by Swagelok Company was used.

The reaction tube (4) and the polymerization terminator supply flow path (7) were connected to two connection ports facing each other among three connection ports of the T-shaped connector. The remaining connection port was used as an outlet for discharging a liquid.

Pipe Line (10):

An SUS316 tube having an outer diameter of 1/8 inches, an inner diameter of 2.17 mm, and a length of 1.7 m; a backpressure valve (44-2361-24) manufactured by TESCOM; and an SUS316 tube having an outer diameter of 1/8 inches, an inner diameter of 2.17 mm, and a length of 0.3 m were connected to each other in this order.

Monomer-Containing Liquid A to be Introduced into Anionic Polymerizable Monomer Supply Flow Path (1):

<p-t-Butoxystyrene/tetrahydrofuran (THF)>

THF (deoxidation grade) manufactured by Wako Pure Chemical Industries, Ltd. and p-t-butoxystyrene (special grade) manufactured by Wako Pure Chemical Industries, Ltd. were added to a 2 L SUS tank, thereby preparing 2 L of a 2 M-p-t-butoxystyrene/THF solution. This solution was dehydrated using a molecular sieve 4A, thereby obtaining a liquid A.

In the present example, the description of "xM-y/z" means a solution obtained by dissolving y in a solvent z, in which the concentration of y in the solution is xM.

Initiator-containing liquid B to be introduced into anionic polymerization initiator supply flow path (2):

<n-Butyllithium (nBuLi)/Toluene>

Toluene (deoxidation grade) manufactured by Wako Pure Chemical Industries, Ltd. was added to a 5 L SUS tank and cooled to 0° C. nBuLi (1.6 M-nBuLi/hexane solution) manufactured by KANTO KAGAKU was added thereto, and titrated using menthol/bipyridine, thereby preparing 4 L of a 0.05 M-nBuLi/toluene solution. The solution was adopted as a liquid B.

Polymerization Terminator to be Introduced into Polymerization Terminator Supply Flow Path (3):

<Methanol (MeOH)/THF>

THF (deoxidation grade) manufactured by Wako Pure Chemical Industries, Ltd. and MeOH (deoxidation grade) manufactured by Wako Pure Chemical Industries, Ltd., were added to a 3 L SUS tank, thereby obtaining 4 L of a 0.5 M-MeOH/THF solution. The obtained solution was used as a polymerization terminator.

Liquid Feeding Condition:

Liquid A (2 M-p-t-butoxystyrene/THF): 56.5 mL/min

Liquid B (0.05 M-nBuLi/toluene): 39.4 mL/min

Polymerization terminator (0.5 M-MeOH/THF): 47.3 mL/min

Flowing time in reaction tube (4): 11.1 seconds

The value of a ratio of r2, which represents a linear velocity of the liquid B flowing in the internal flow path of the smallest cylinder of the double-layered cylindrical mixer (3b), to r1, which represents a linear velocity of the liquid A flowing in the flow path adjacent to the internal flow path of the smallest cylinder of the mixer:

$r2/r1=0.53$

Extraction:

From the outlet of the pipe line (10), 10 mL of a solution containing a polymer (poly(p-t-butoxystyrene)) was collected, and the molecular weight and the molecular weight distribution of the polymer were measured by gel permeation chromatography (GPC). As a result, the number-average molecular weight (Mn) was 4,300, and the molecular weight distribution (dispersity, Mw/Mn) was 1.19.

In the present specification, GPC was performed under the following condition.

Device: HLC-8220GPC (manufactured by Tosoh Corporation)

Detector: differential refractometer (Refractive Index (RI) detector)

Pre-column: TSK GUARD COLUMN HXL-L 6 mm×40 mm (manufactured by Tosoh Corporation)

Sample side column: the following three columns connected in series in the following order (manufactured by Tosoh Corporation)

TSK-GEL GMHXL 7.8 mm×300 mm
TSK-GEL G4000HXL 7.8 mm×300 mm
TSK-GEL G2000HXL 7.8 mm×300 mm

Reference side column: TSK-GEL G1000HXL 7.8 mm×300 mm

Temperature of constant-temperature tank: 40° C.
Mobile layer: THF
Flow rate of mobile layer on sample side: 1.0 mL/min
Flow rate of mobile layer on reference side: 1.0 mL/min
Sample concentration: 0.1% by mass
Amount of sample injected: 100 μL
Data pickup time: 5 minutes to 45 minutes after injection of sample
Sampling pitch: 300 msec Example 2

A polymer was obtained in the same manner as in Example 1, except that the flow velocity of each of the liquids to be introduced in Example 1 was changed as below.
Liquid Feeding Condition:
Liquid A (2 M-p-t-butoxystyrene/THF): 66.0 mL/min
Liquid B (0.05 M-nBuLi/toluene): 46.0 mL/min
Polymerization terminator (0.5 M-MeOH/THF): 55.2 mL/min
Flowing time in reaction tube (4): 9.5 seconds
$r2/r1=0.53$ The obtained polymer had Mn of 4,270 and Mw/Mn of 1.11.

Example 3

A polymer was obtained in the same manner as in Example 1, except that the flow velocity of each of the liquids to be introduced in Example 1 was changed as below.
Liquid Feeding Condition:
Liquid A (2 M-p-t-butoxystyrene/THF): 85.0 mL/min
Liquid B (0.05 M-nBuLi/toluene): 59.3 mL/min
Polymerization terminator (0.5 M-MeOH/THF): 71.1 mL/min
Flowing time in reaction tube (4): 7.4 seconds
$r2/r1=0.53$ The obtained polymer had Mn of 4,220 and Mw/Mn of 1.08.

Example 4

A polymer was obtained in the same manner as in Example 1, except that the flow velocity of each of the liquids to be introduced in Example 1 was changed as below.
Liquid Feeding Condition:
Liquid A (2 M-p-t-butoxystyrene/THF): 59.3 mL/min
Liquid B (0.05 M-nBuLi/toluene): 50.5 mL/min
Polymerization terminator (0.5 M-MeOH/THF): 71.2 mL/min
Flowing time in reaction tube (4): 9.7 seconds
$r2/r1=0.44$ The obtained polymer had Mn of 5,010 and Mw/Mn of 1.14.

Example 5

A polymer was obtained in the same manner as in Example 1, except that the flow velocity of each of the liquids to be introduced in Example 1 was changed as below.
Liquid Feeding Condition:
Liquid A (2 M-p-t-butoxystyrene/THF): 34.0 mL/min
Liquid B (0.05 M-nBuLi/toluene): 29.1 mL/min
Polymerization terminator (0.5 M-MeOH/THF): 40.8 mL/min
Flowing time in reaction tube (4): 16.9 seconds
$r2/r1=0.44$ The obtained polymer had Mn of 4,820 and Mw/Mn of 1.24.

Comparative Example 1

In Example 1, as a mixer used in the joining region (3), instead of the double-layered cylindrical mixer, a T-shaped mixer (UNION TEE (SS-200-3) manufactured by Swagelok Company) was used. The anionic polymerizable monomer supply flow path (1) and the anionic polymerization initiator supply flow path (2) were connected to two connection ports facing each other among three connection ports of the T-shaped mixer. The reaction tube (4) was connected to the remaining connection port.

The flow velocity of each of the liquids to be introduced was as below.
Liquid Feeding Condition:
Liquid A (2 M-p-t-butoxystyrene/THF): 59.3 mL/min
Liquid B (0.05 M-nBuLi/toluene): 50.5 mL/min
Polymerization terminator (0.5 M-MeOH/THF): 71.2 mL/min
Flowing time in reaction tube (4): 9.7 seconds
The obtained polymer had Mn of 4,940 and Mw/Mn of 1.17.

Comparative Example 2

A polymer was obtained in the same manner as in Comparative Example 1, except that the flow velocity of each of the liquids to be introduced in Comparative Example 1 was changed as below.
Liquid Feeding Condition:
Liquid A (2 M-p-t-butoxystyrene/THF): 34.0 mL/min
Liquid B (0.05 M-nBuLi/toluene): 29.1 mL/min
Polymerization terminator (0.5 M-MeOH/THF): 40.8 mL/min
Flowing time in reaction tube (4): 16.9 seconds
The obtained polymer had Mn of 4,890 and Mw/Mn of 1.39.

Comparative Example 3

A polymer was obtained in the same manner as in Comparative Example 1, except that the flow velocity of each of the liquids to be introduced in Comparative Example 1 was changed as below.

Liquid Feeding Condition:
Liquid A (2 M-p-t-butoxystyrene/THF): 55.4 mL/min
Liquid B (0.07 M-nBuLi/toluene): 38.8 mL/min
Polymerization terminator (0.5 M-MeOH/THF): 47.0 mL/min
Flowing time in reaction tube (4): 11.3 seconds
The obtained polymer had Mn of 4,750 and Mw/Mn of 1.26.

Comparative Example 4

A polymer was obtained in the same manner as in Comparative Example 1, except that the flow velocity of each of the liquids to be introduced in Comparative Example 1 was changed as below.
Liquid Feeding Condition:
Liquid A (2 M-p-t-butoxystyrene/THF): 65.0 mL/min
Liquid B (0.07 M-nBuLi/toluene): 45.5 mL/min
Polymerization terminator (0.5 M-MeOH/THF): 55.1 mL/min
Flowing time in reaction tube (4): 9.6 seconds
The obtained polymer had Mn of 4,900 and Mw/Mn of 1.11.

The results of the above examples and comparative examples are shown in the following table.

ample 1), the dispersity slightly changes by a factor of 1.10 (Example 1/Example 3). Therefore, it was found that the change in the dispersity relative to the flow velocity is effectively suppressed.

Furthermore, the same comparison as described above was performed under the condition of "flow velocity of liquid A/flow velocity of liquid B" of 1.17. It was found that in a case where the T-shaped mixer is used, the closer the flow velocities of the liquid A and the liquid B colliding with each other in the mixer to some extent, the higher the uniformity in mixing. Presumably, for this reason, in the system using the T-shaped mixer, the uniformity of the mixed solutions may be higher under the condition of "flow velocity of liquid A/flow velocity of liquid B" of 1.17 than under the condition of "flow velocity of liquid A/flow velocity of liquid B" of 1.43. However, it was found that in this system, in a case where the T-shaped mixer is used, while the flow velocity changed changes by a factor of 1.7 (Comparative Example 1/Comparative Example 2), the dispersity greatly changes by a factor of 1.18 (Comparative Example 2/Comparative Example 1). In contrast, it was understood that in a case where the multilayered cylindrical mixer is used, even though the flow velocity changes by a factor of 1.7 (Example 4/Example 5), the dispersity of the

TABLE 1

| | Joining region (3) multilayered cylindrical mixer | | | | | Joining region (3) T-shaped mixer | | | |
|---|---|---|---|---|---|---|---|---|---|
| | Example 1 | Example 2 | Example 3 | Example 4 | Example 5 | Comparative Example 1 | Comparative Example 2 | Comparative Example 3 | Comparative Example 4 |
| Flow velocity of liquid A (mL/min) | 56.5 | 66.0 | 85.0 | 59.3 | 34.0 | 59.3 | 34.0 | 55.4 | 65.0 |
| Flow velocity of liquid B (mL/min) | 39.4 | 46.0 | 59.3 | 50.5 | 29.1 | 50.5 | 29.1 | 38.8 | 45.5 |
| Flow velocity of liquid A/flow velocity of liquid B | 1.43 | 1.43 | 1.43 | 1.17 | 1.17 | 1.17 | 1.17 | 1.43 | 1.43 |
| Ratio of linear velocity of multilayer cylinder (r2/r1) | 0.53 | 0.53 | 0.53 | 0.44 | 0.44 | — | — | — | — |
| Mn | 4,300 | 4,270 | 4,220 | 5,010 | 4,820 | 4,940 | 4,890 | 4,750 | 4,900 |
| Mw/Mn | 1.19 | 1.11 | 1.08 | 1.14 | 1.24 | 1.17 | 1.39 | 1.26 | 1.11 |

The results shown in the table will be explained.

First, under the condition of "flow velocity of liquid A/flow velocity of liquid B" of 1.43, a case where a T-shaped mixer was used in the joining region (3) was compared with a case where a multilayered cylindrical mixer was used in the joining region (3) so as to investigate the influence of the flow velocity on the dispersity of the obtained polymer. Through the comparison, it was found that in a case where the T-shaped mixer is used, while the flow velocity changes by a factor of 1.17 (Comparative Example 4/Comparative Example 3), the dispersity changes by a factor of 1.14 (Comparative Example 3/Comparative Example 4). In contrast, it was found that in a case where a multilayered cylindrical mixer is used, even though the flow velocity changes by a factor of 1.17 (Example 2/Example 1), the dispersity slightly changes by a factor of 1.07 (Example 1/Example 2). Furthermore, it was found that in a case where the multilayered cylindrical mixer is used, even though the flow velocity changes by a factor of 1.5 (Example 3/Exobtained polymer slightly changes by a factor of 1.09 (Example 5/Example 4). Therefore, it was found that the change in the dispersity relative to the flow velocity is effectively suppressed as well.

Hitherto, the present invention has been described based on embodiments thereof. However, unless otherwise specified, the present invention is not limited to any of the description of the present invention. The inventors of the present invention consider that the present invention should be interpreted widely without departing from gist and the scope of the present invention described in the attached claims.

The present application claims a priority based on JP2017-188932 field on Sep. 28, 2017, the content of which is incorporated into the present specification as a portion of the description of the present specification.

EXPLANATION OF REFERENCES 100, 200: flow-type reaction system
1: anionic polymerizable monomer supply flow path 2: anionic polymerization initiator supply flow path
3: joining region (joining of liquid A and liquid B)
3b: double-layered cylindrical mixer
3c: triple-layered cylindrical mixer
4: reaction tube
5, 6, 9, 12: liquid introduction means (syringe pump)
7: polymerization terminator supply flow path
8: joining region (joining of reaction solution and terminator)
10: pipe line
PS: polymer solution
R1: low-temperature constant-temperature tank
T1: smallest cylinder
T2: outer tube
T3: middle tube
J: joining portion
A, B: opening
O: flow direction

What is claimed is:

1. A method for manufacturing a polymer by performing an anionic polymerization reaction by a flow-type reaction, comprising:
introducing a liquid A containing an anionic polymerizable monomer, a liquid B containing an anionic polymerization initiator, and a polymerization terminator into different flow paths respectively and causing the liquids to flow in the respective flow paths;
causing the liquid A and the liquid B to join together by using a multilayered cylindrical mixer, wherein the multilayered cylindrical mixer comprises a smallest cylinder and an adjacent cylinder which is adjacent to the smallest cylinder, the interior of the smallest cylinder defines an internal flow path and a portion between the smallest cylinder and the adjacent cylinder defines an adjacent flow path, the liquid A and the liquid B join together in a joining portion, wherein the joining portion is in a terminal portion of the smallest cylinder and is disposed in the adjacent cylinder;
subjecting the anionic polymerizable monomer to anionic polymerization while a solution formed by the joining is flowing to downstream in a reaction flow path; and
causing the solution, which has undergone the polymerization reaction and flows in the reaction flow path, and the polymerization terminator to join together such that the polymerization reaction is terminated,
wherein a liquid flowing in the internal flow path has a linear velocity r1 and a liquid flowing in the adjacent flow path has a linear velocity r2, and a value of a ratio of r2 to r1 satisfies the following Expression (I) or (II):

$$r2/r1 \leq 0.67 \quad (I)$$

$$r2/r1 \geq 1.5 \quad (II)$$

here, any one of the liquid flowing in the internal flow path or the liquid flowing in the adjacent flow path is the liquid A, and the other is the liquid B.

2. The method for manufacturing a polymer according to claim 1,
wherein a flow velocity at which the liquid B is introduced is 10 to 500 mL/min.

3. The method for manufacturing a polymer according to claim 1,
wherein a ratio of a flow velocity A, at which the liquid A is introduced, to a flow velocity B, at which the liquid B is introduced, that is represented by [flow velocity A]/[flow velocity B] is 10/1 to 1.2/1.

4. The method for manufacturing a polymer according to claim 1,
wherein an equivalent diameter of the smallest cylinder of the multilayered cylindrical mixer is 0.1 to 50 mm.

5. The method for manufacturing a polymer according to claim 1,
wherein a double-layered cylindrical mixer is used as the multilayered cylindrical mixer.

6. The method for manufacturing a polymer according to claim 1,
wherein at least one anionic polymerization initiator between an organic lithium compound and an organic magnesium compound is used as the anionic polymerization initiator.

7. The method for manufacturing a polymer according to claim 1,
wherein n-butyllithium is used as the anionic polymerization initiator.

8. The method for manufacturing a polymer according to claim 1,
wherein the liquid B contains an aromatic hydrocarbon.

9. A flow-type reaction system for manufacturing a polymer by an anionic polymerization reaction, comprising at least:
a first flow path through which a liquid A containing an anionic polymerizable monomer flows;
a second flow path through which a liquid B containing an anionic polymerization initiator flows;
a third flow path through which a polymerization terminator flows;
a first joining region having a multilayered cylindrical mixer in which the first flow path and the second flow path join together;
a reaction tube connected to a downstream of the first joining region;
a second joining region in which the reaction tube and the third flow path join together; and
a pipe line connected to a downstream of the second joining region, wherein the multilayered cylindrical mixer comprises a smallest cylinder and an adjacent cylinder which is adjacent to the smallest cylinder, the interior of the smallest cylinder defines an internal flow path and a portion between the smallest cylinder and the adjacent cylinder defines an adjacent flow path, the liquid A and the liquid B join together in a joining portion, wherein the joining portion is in a terminal portion of the smallest cylinder and is disposed in the adjacent cylinder,
wherein a liquid flowing in the internal flow path has a linear velocity r1 and a liquid flowing in the adjacent flow path has a linear velocity r2, a ratio of r2 to r1 satisfies the following Expression (I) or (II):

$$r2/r1 \leq 0.67 \quad (I)$$

$$r2/r1 \geq 1.5 \quad (II)$$

here, any one of the liquid flowing in the internal flow path of the smallest cylinder or the liquid flowing in the adjacent flow path is the liquid A, and the other is the liquid B.

10. The method for manufacturing a polymer according to claim 1,
wherein in the step of causing the liquid A and the liquid B to join together in the multilayered cylindrical mixer, a certain level of negative pressure is applied to a portion where the linear velocity is high, a flow coming into the portion occurs, and in the step of causing the solution and the polymerization terminator to join together, an interface between the liquid A and the liquid B form a thin layer.

\* \* \* \* \*